Aug. 23, 1927.  1,639,955
J. H. MURCH
SOLDERING MACHINE
Filed July 13, 1925   3 Sheets-Sheet 1
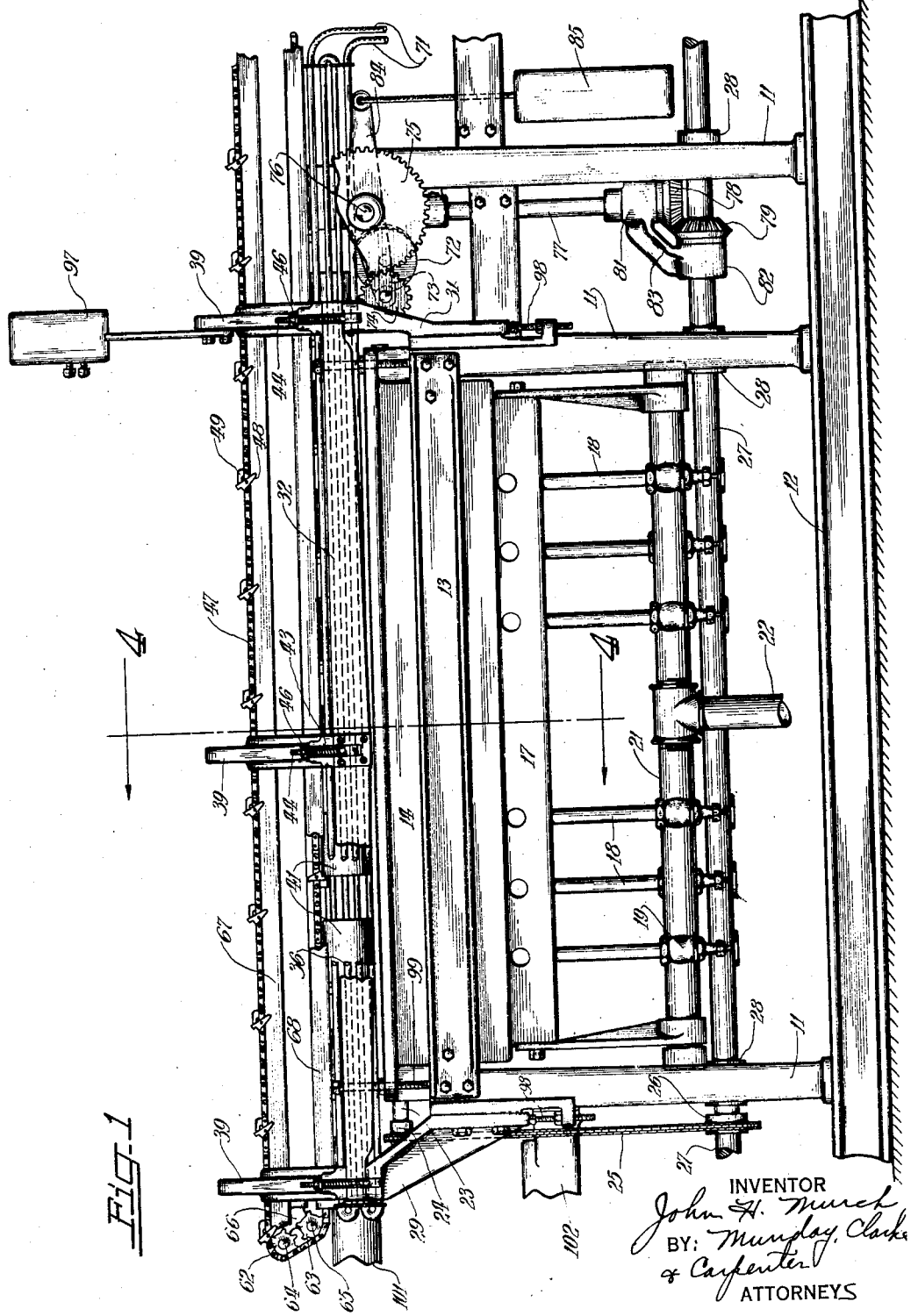
INVENTOR
John H. Murch
BY: Munday, Clarke
& Carpenter
ATTORNEYS

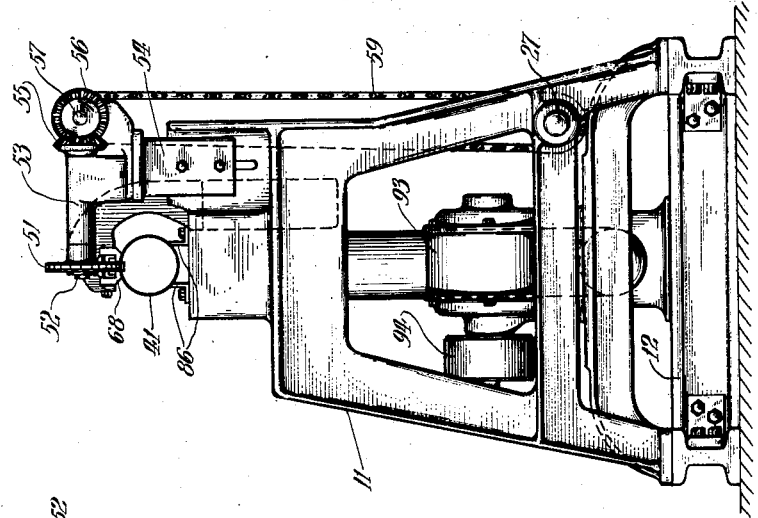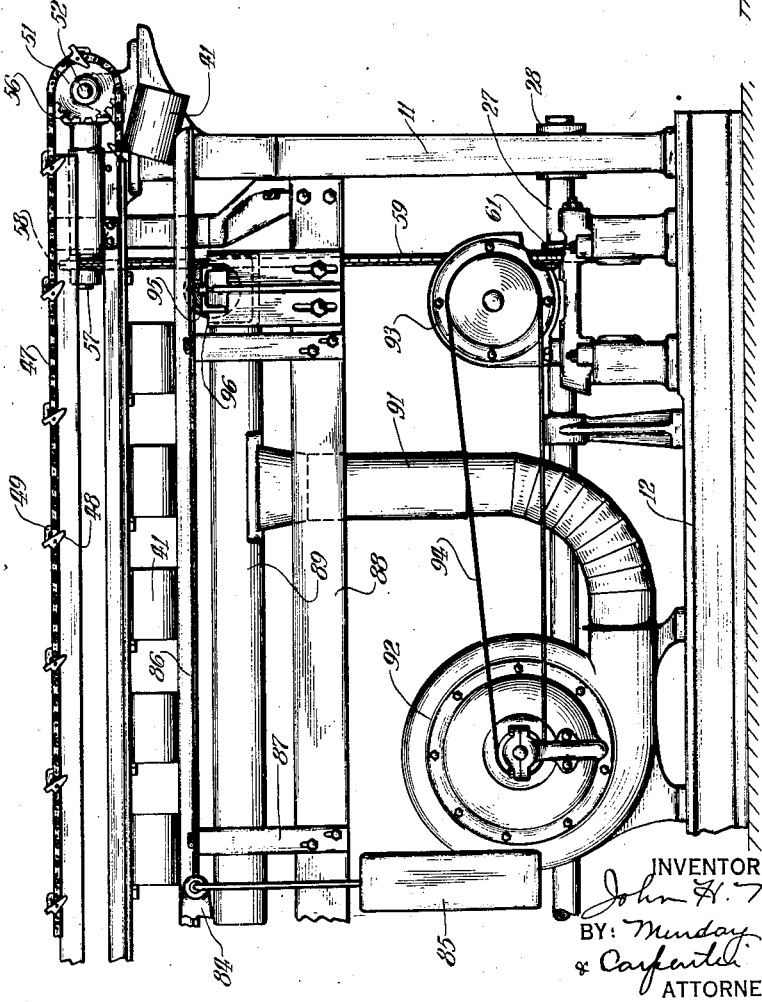

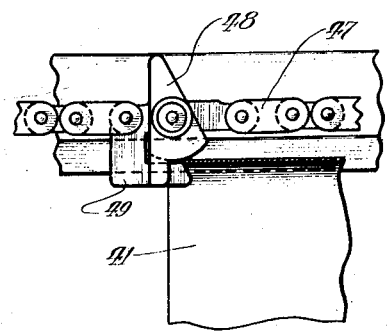

Patented Aug. 23, 1927.

1,639,955

UNITED STATES PATENT OFFICE.

JOHN H. MURCH, OF EAST ORANGE, NEW JERSEY, ASSIGNOR TO AMERICAN CAN COMPANY, OF NEW YORK, N. Y., A CORPORATION OF NEW JERSEY.

SOLDERING MACHINE.

Application filed July 13, 1925. Serial No. 43,067.

My invention relates to soldering machines, such as are commonly used in conjunction with can body makers, and has for its primary object the provision of an improvement in the supporting and guiding mechanism for the can bodies adapted to overcome difficulties heretofore resulting from the high temperature of the solder applied to the side seam of the can body from a solder bath beneath the path of travel of the bodies.

In accordance with current practice, can bodies are conveyed through the machine supported by what is known as a solder horse, which may be either a horn over which the can body travels, or an outside guiding and supporting mechanism, such as that shown in Patent No. 1,130,636, granted March 2, 1915, to Frank Rudolphi, assignor to the American Can Company, the solder being applied to the can body side seam by means of an applying roll, rotating in a bath of molten solder contained in a receptacle beneath the solder horse. This molten solder is maintained at a temperature of over 400° F. and this high temperature causes expansion of the metal guides, with resulting distortion and non-alignment of parts of the mechanism. On this account, it has been necessary to limit the length of the solder applying roll and the solder horse used in order to prevent the rise of temperature of the parts of said solder horse which would occur if the latter were of sufficient length to permit the highest rate of production. My invention provides means for maintaining the supporting and guiding mechanism for the can bodies at a low temperature at all times, regardless of the temperature of the solder bath, and in this manner eliminates the expansion and distortion of the parts which has heretofore occured and makes possible an increase in the length of the solder horse to the highest point of efficiency, it being possible, by the use of my invention, to solder cans at the rate of three hundred per minute, or more; whereas with the former types of apparatus, the rate was approximately one hundred fifty per minute. This is accomplished by making the supports or guides, for the can bodies in the form of pipes, or conduits, through which a constant circulation of cool water is maintained, thereby preventing the can body and the solder horse from becoming unduly heated by conduction of heat from the solder which is applied to the side seam. The advantages resulting from this improvement include not only the protection of the mechanism, as above-mentioned, but also more uniform soldering of the side seam by reason of quicker and more complete chilling, or setting, of the solder therein as the can bodies move along the solder horse.

The invention also contemplates the provision of a simple and inexpensive mechanism, having the advantages aforesaid, which is adequately supported at all points and which is accessible to remove the can bodies when occasion requires.

Numerous other objects and advantages of the invention will be apparent as it is better understood from the following description, which, taken in connection with the accompanying drawings, discloses a preferred embodiment thereof.

Referring to the drawings,

Figure 1 is a side elevation of a portion of a soldering machine in which my invention is embodied, certain parts being broken away to better illustrate certain others;

Fig. 2 is an elevational view of the remainder of the machine, forming a continuation of Fig. 1 toward the right;

Fig. 3 is an end elevation of the terminal, or discharge end of the machine shown in Fig. 2;

Fig. 4 is a view, partially in section and partially in elevation, taken substantially on the line 4—4 in Fig. 1; and Fig. 5 is a detail view of a portion of the conveyor, showing one of the holding links in engagement with a can body, which is fragmentally shown in section.

Upon said drawings, illustrating the best manner in which I have thus far contemplated applying the principles of my invention, the reference character 11 indicates a plurality of uprights, arising from a base 12 and carrying at the top thereof a horizontal frame 13, within which is disposed an elongated solder pot 14, in which a solder applying roll 15 is journaled for rotation in a bath 16 of molten solder. The solder is heated by means of burners (not shown) enclosed within a protecting shell, or casing, 17 and are served by pipes 18, extending upwardly from hand operated valves 19, disposed at intervals along a manifold 21, communicably connected with a supply pipe 110

22. Said solder applying roll 15 is carried upon a shaft 23, journaled in opposite ends of the solder pot 14, and said shaft is driven by means of a sprocket 24, a driving chain 25 and a sprocket 26 mounted upon a horizontal drive shaft 27, journaled in suitable bearings 28 in the uprights or standards 11. Said shaft 27 may be driven from any suitable source of power and is operatively connected with other moving elements of the machine, as will be hereinafter more particularly described.

The can body guiding and conveying mechanism is supported above the solder applying roll 15 by means of brackets 29 and 31, which carry horizontal channel irons 32 and 33. A plurality of brackets 34 are secured to the channel iron 33, and each supports a bracket 35, these brackets in turn supporting a series of pipes 36 which, with a corresponding series 37, carried in brackets 38 supported by brackets 39 at the opposite side of the machine, form a guideway and support for the can bodies, which are indicated by the reference character 41. Said brackets 39 are pivoted at 42 to the brackets 34 and have bifurcated extensions 43 disposed on top of the channel irons 32. Said extensions 43 are adapted to be releasably clamped to said channel iron by means of bolts 44, pivoted at 45 and carrying clamping nuts 46 adapted to be tightened down upon the extensions 43 when said bolts are swung upwardly to the position shown in Figs. 1 and 4 of the drawings. With this construction, it will be evident that the brackets 39 may be readily lifted to permit access to the can bodies, or to the interior mechanism of the solder horse. The pipes 36 and 37, in the present instance, are disposed in arcuate arrangement and adapted to support a circular can body, though it will be apparent that they might be disposed in rectangular, or other arrangement, to correspond to the contour of can bodies of other form.

For the purpose of propelling the can bodies through the guides of said solder horse, a conveyor chain 47 is provided and equipped with cooperating can body engaging members 48 and 49, arranged at intervals along the length of said chain. The chain is driven by means of a sprocket 51, mounted upon a shaft 52, journaled for rotation in a bearing 53 extended upwardly from a bracket 54 supported by one of the uprights 11 (see Figs. 2 and 3). The opposite end of said shaft 52 carries a beveled gear 55, meshing with a gear 56 on a longitudinal shaft 57, which carries at its opposite end a sprocket 58, driven by a chain 59, taken over a sprocket 61 on the shaft 27.

At the opposite end of the machine, said conveyor chain 47 takes over sprockets 62 and 63, carried upon studs 64 and 65, journaled in an extension 66 of a supporting bar 67, over which the conveyor 47 is directed in the upper course of its travel. Said conveyor, during the lower course of its travel, is guided in a channel guideway 68, carried by the brackets 34 (see Fig. 4). The conveyor 47 operated as described, directs the can bodies over the solder roll 15 in timed relation to the rotation of the latter and with the side seam 69 in position to have the solder applied thereto by said solder applying roll.

The pipes 36 and 37 are adapted to be supplied with a cooling medium, such as cold water, from any suitable source, flexible hose connections 71 being provided in the present instance, and it will be apparent that the can bodies are thereby kept from excessive heating and the guideways and associated mechanism, ordinarily highly heated by conduction, are protected so that expansion and consequent distortion thereof is avoided. For this reason, the solder horse may be much longer than in former types of machines without the danger of an accumulation of heat, which has, in the past, made it impossible to extend said solder horse to the length at which the highest rate of production is possible.

After the can bodies have been passed over the solder roll 15 and a film of solder forced into the side seam thereof, they are moved past a wiping device, which removes the excess solder and cleans the seam. This device, illustrated in Fig. 1 of the drawings, comprises a wiper roll 72, mounted upon a short shaft 73, which carries a pinion 74, meshing with a gear 75 on a shaft 76, which is driven by a gear connection (not shown) from a vertical shaft 77, carrying at its lower end a bevel gear 78, meshing with a similar gear 79 on the drive shaft 27, said shafts 77 and 27 having bearings 81 and 82 adjacent said gears 78 and 79 in a bracket 83, extended inwardly from one of the uprights 11. The shaft 73 has a bearing in a rocking lever 84, journaled about the shaft 76, a weight 85 being suspended from the end of said lever opposite that in which said shaft 73 is carried. Said weight tends to hold the wiper roll in contact with the can bodies and at the same time, the rocking lever permits movement thereof toward and from said bodies in a manner which will be readily understood.

After passing the wiper mechanism, said bodies are directed onto angle irons 86, supported by uprights 87 secured to a horizontal frame member 88 attached at its opposite ends to adjacent uprights 11 (see Figs. 2 and 3). During this part of the travel, the bodies are cooled by means of an air blast from a slotted pipe 89 and connected by means of a pipe 91 to a blower 92, which is driven from a motor 93 by a belt 94. The side seams are then further chilled by means of a water applying roller 95, mounted for rotation in a water pan 96, supported from the frame member 88, as shown in Fig. 2. The can bodies are then discharged from the machine and are ready for a further operation.

For the purpose of facilitating movement of the brackets 39 about the pivots 42, one thereof is preferably provided with a counter weight 97, as shown in Fig. 1.

The entire solder horse may be vertically adjusted by means of adjusting screws 98, the brackets 29 and 31 being suitably slotted for this purpose and the solder pot is adjustably supported from the channel irons 32 and 33 by means of screws 99.

The soldering machine just described is adapted, in ordinary practice, to be placed as a continuation of a body making machine, the forming horn 101 of which is shown at the left of Fig. 1, and communicates directly with the guideways formed by the pipes 36 and 37. A frame part 102, connecting the soldering and body making machines, is also shown in Fig. 1.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. In a soldering machine, the combination of a solder bath receptacle, a solder applying roll adapted to carry solder from said bath and apply the same to the side seam of can bodies or the like, a conveyor for directing the bodies longitudinally of said roll, and a solder horse having supporting and guiding means for said can bodies adapted to have a cooling medium circulated therethrough to prevent undue heating of the can bodies and the mechanism during the soldering operation.

2. In a soldering machine, the combination of a solder bath receptacle, a solder applying roll adapted to carry solder from said bath and apply the same to the side seam of can bodies or the like, a conveyor for directing the bodies longitudinally of said roll, and a solder horse having supporting and guiding means for said can bodies comprising a plurality of pipes adapted to have a cooling medium circulated therethrough to prevent undue heating of the can bodies and the mechanism during the soldering operation.

3. In a soldering machine, the combination of a solder bath receptacle, a solder applying roll adapted to carry solder from said bath and apply the same to the side seam of can bodies or the like, means for feeding the can bodies longitudinally of said roll, and means arranged above the solder bath for cooling said bodies during the soldering operation.

4. In a soldering machine, the combination of a solder bath receptacle, a solder applying roll adapted to carry solder from said bath and apply the same to the side seam of can bodies or the like, means for feeding the can bodies longitudinally of said roll, and a solder horse having means for guiding said can bodies during their course of travel along said roll, said means being also adapted to prevent undue heating of said bodies during the soldering operation.

5. In a soldering machine, the combination of a solder bath receptacle, a solder applying roll adapted to carry solder from said bath and apply the same to the side seam of can bodies or the like, means for feeding the can bodies longitudinally of said roll, and a horn for supporting and guiding the can bodies as they are moved along said roll, said horn being also adapted to conduct cooling fluid to prevent undue heating of said bodies during the soldering operation.

6. In a soldering machine, the combination of a solder bath receptacle, a solder applying roll adapted to carry solder from said bath and apply the same to the side seam of can bodies or the like, means for feeding the can bodies longitudinally of said roll, and an outside horn for supporting and guiding the can bodies as they are moved along said roll, said horn being also adapted to conduct cooling fluid to prevent undue heating of said bodies during the soldering operation.

7. In a soldering machine, the combination of a solder bath receptacle, a solder applying roll adapted to carry solder from said bath and apply the same to the side seam of can bodies or the like, means for feeding the can bodies longitudinally of said roll, and a horn conforming to the contour of the bodies for guiding the same in proper relationship to said roll, said horn being formed to permit the circulation therethrough of a cooling medium.

8. In a soldering machine, the combination of a frame, means for feeding can bodies or the like along said frame, means for containing a bath of molten solder, means for applying solder to the side seams of the can bodies during their travel through the machine, and means extending along the soldering station and over the solder bath for cooling said bodies to prevent undue heating thereof and of the mechanism during the soldering operation.

JOHN H. MURCH.